(12) United States Patent
Keller et al.

(10) Patent No.: US 8,621,251 B1
(45) Date of Patent: Dec. 31, 2013

(54) DEVICE OPERATION IN A REDUCED OPERATIONAL MODE

(75) Inventors: Kevin E. Keller, Sunnyvale, CA (US); Steven D. McKenney, Seattle, WA (US); Paul E. Misener, Great Falls, VA (US); David Y. Woo, Seattle, WA (US); Gregg Elliott Zehr, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 243 days.

(21) Appl. No.: 13/034,661

(22) Filed: Feb. 24, 2011

(51) Int. Cl.
*G06F 1/26* (2006.01)

(52) U.S. Cl.
USPC ............................ 713/310; 713/300; 713/320

(58) Field of Classification Search
USPC .......................... 713/100, 300, 310, 320, 324
See application file for complete search history.

(56) References Cited

U.S. PATENT DOCUMENTS

| 5,815,407 A * | 9/1998 | Huffman et al. ................. 702/57 |
| 2008/0165146 A1 * | 7/2008 | Matas ........................... 345/173 |
| 2011/0241827 A1 * | 10/2011 | Varoglu ....................... 340/5.52 |

* cited by examiner

*Primary Examiner* — Paul Yanchus, III
(74) *Attorney, Agent, or Firm* — Lee & Hayes, PLLC

(57) ABSTRACT

A computing device may operate in various modes, which may include a full operational mode and a reduced operational mode. When operating in the reduced operational mode, the computing device may reduce power, reduce radiation output, and/or power off various components to achieve operation in accordance with an operational policy. While operating in the reduced operational mode, the computing device may restrict user access to or adjustment of the impacted components thereby preventing the user from restoring the computing device to the full operational mode, at least temporarily. In some aspects, the device may initiate or terminate the reduced operational mode in response to a signal from a beacon, parameters from a monitored environment, or in response to user commands. In various aspects, the device may provide messaging to inform the user about the modes of operation.

33 Claims, 12 Drawing Sheets

DEVICE OPERATION IN A REDUCED OPERATIONAL MODE

BACKGROUND

Computing devices have become ubiquitous in almost every environment. Mobile telephones, laptop computers, and tablet computers are commonly used for work and pleasure and often accompany people in many daily activities. People often travel with computers and mobile phones, bring these devices to school, and use these devices in public places. Interacting with these devices has become part of daily routines and accepted social norms.

However, in some situations, the use of computing devices may be restricted or otherwise not permitted for various reasons. For example, the Federal Aviation Agency (FAA) guidelines restrict use of computing devices by passengers during takeoff and landing of commercial aircraft. In some academic environments, use of communicating devices may be restricted at times, such as during an examination.

Other environments may limit use of some functionality of a computing device. For example, a museum may allow use of a mobile phone for text messaging and email, but may restrict use of the device for voice calls and photography.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to controlling operation of a computing device to selectively initiate a reduced operational mode that conforms to a predetermined operational policy or standard of operation. As described herein, the computing device may operate in various modes, which may include a full operational mode and at least one reduced operational mode. When operating in a reduced operational mode, the computing device may disable, reduce power, reduce radiation output, or power off various components to achieve operation of the computing device in accordance with the operational policy. For example, the computing device may reduce power or power off processors, reduce power to a display, disable or power off radios (e.g., Wi-Fi, 3G, GPS, etc.), disable a camera, and so forth. While in the reduced operational mode, the computing device may restrict user access to or adjustment of the impacted components thereby preventing the user from restoring the computing device to the full operational mode, at least temporarily. When a computing device is configured to operate in the reduced operational mode, the computing device may be permitted to operate in accordance with an operational policy while other computing devices that do not have the reduced functionality mode may be restricted from use due to the operational policy.

The computing device may initiate the reduced operational mode in response to a signal from a beacon, parameters from a monitored environment, or in response to user commands. The computing device may return to the full operational mode after receipt of another signal, a change in the parameters, additional user input, a lapse of time, or other possible actions.

In some instances, the computing device may provide messaging about the operation in the reduced operational mode, such as which components are affected by the reduced operational mode. A compliance indicator may be activated during the reduced operational mode to communicate compliance with the operational policy.

The techniques and systems described herein may be implemented in a number of ways. Example implementations are provided below with reference to the following figures.

Illustrative Environment

Figure 1:
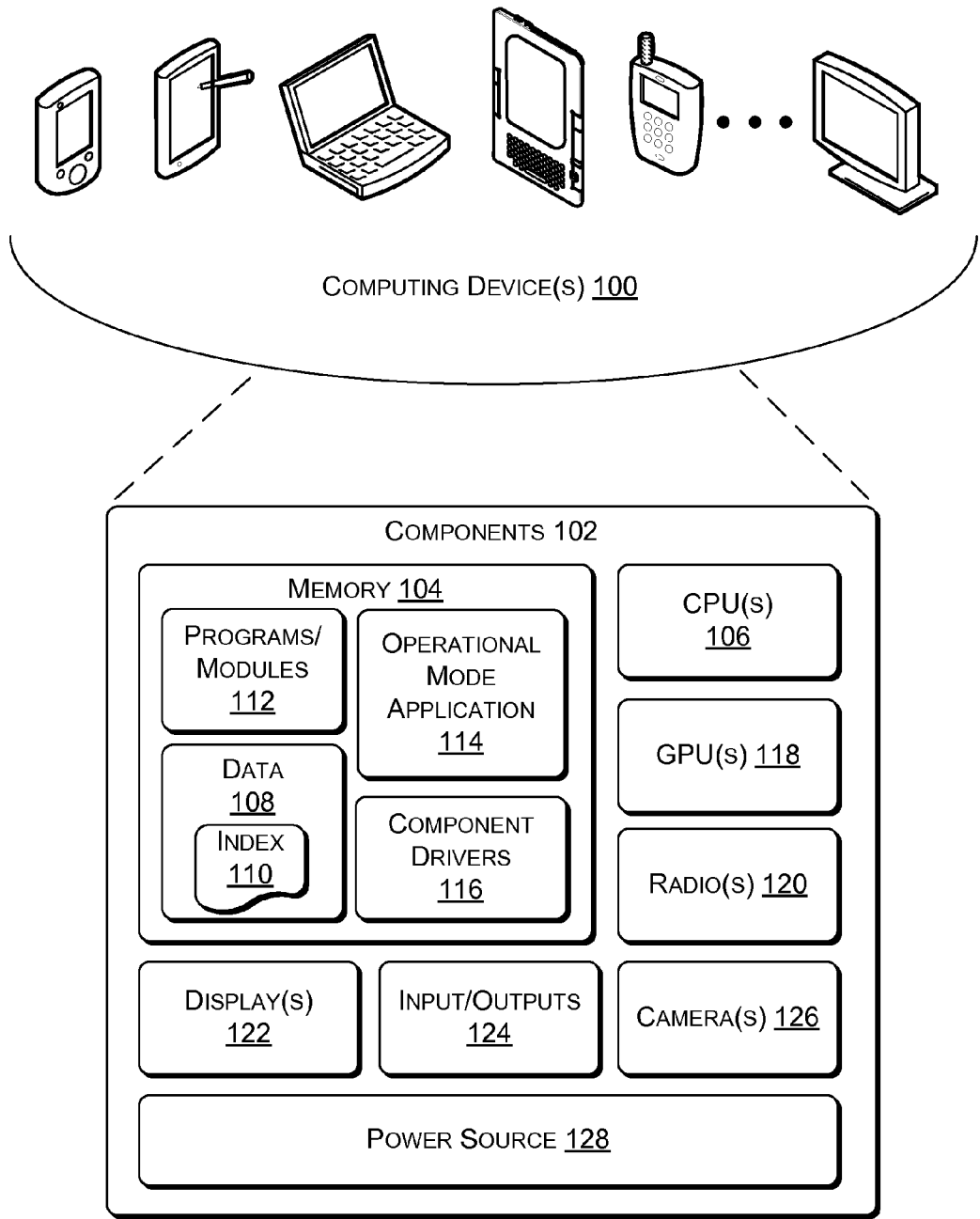
FIG. 1 is a schematic diagram of an illustrative computing device usable to operate in a reduced operational mode.

FIG. 1 shows illustrative computing devices 100 (or simply "devices") that may operate in various modes of operation, including a full operational mode and one or more reduced operational modes. In the illustrated implementation, the devices 100 are represented by various computing devices that each includes a power source and an output mechanism, such as a display. A non-exhaustive list of the devices 100 may include a notebook computer, a music player, a mobile telephone (including smartphones), a tablet computer, an electronic book (eBook) reader device, and a monitor (with or without a television tuner), and so forth. However, many other types of devices may be configured to operate in various modes, which may include a reduced operational mode as discussed herein.

As illustrated, the devices 100 include various components 102. In some embodiments, the components 102 include memory 104 and one or more central processing unit(s) (CPU) 106. The CPU(s) 106 interact with the memory 104 to execute instructions and facilitate operation of the device 100. The memory 104, meanwhile, may be used to store data 108, such as data files, audio and/or video media, electronic books (eBooks), or the like. In some embodiments, the data 108 may include an index file 110 to enable selection of components involved in the reduced operational mode as discussed in FIGS. 8 and 9. The memory 104 may also include software programs or other executable modules 112 that may be executed by the CPU(s) 106. Examples of such programs or modules include indexing modules for indexing data, reader programs, control modules (e.g., power management), network connection software, an operating system, sensor algorithms, and so forth. The memory 104 may include volatile memory (such as RAM), nonvolatile memory, removable memory, and/or non-removable memory, implemented in any method or technology for storage of information, such as computer-readable instructions, data structures, program modules, or other data. Also, the CPU(s) 106 may include onboard memory in addition to or instead of the memory 104. Some examples of storage media that may be included in the memory 104 and/or CPU(s) 106 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the devices 100. Any such computer-readable media may be part of the devices 100.

In accordance with one or more embodiments, the memory 104 may include an operational mode application 114 that may be used to select, either via a remote command or a local command, operational modes that include at least a full operational mode and a reduced operational mode. The operational mode application 114 may selectively activate, deactivate, increase/reduce power, increase/reduce radiation output, or otherwise control various ones of the components 102 to implement the operational modes, such as the reduced operational mode. For example, in some instances, the operational mode application 114 may reduce power or turn off a portion of the CPU(s) 106, such as one or more cores of a multi-core CPU.

The memory 104 may also store component drivers 116 that include instructions that, when executed by the CPU(s), are used to control the various components 102. For example, the component drivers 116 are programs that can be used to control the operation, power consumption, and various operational states of each of the components 102. Typically, each component has its own corresponding component driver.

The components may also include graphics processor unit(s) (GPU) 118, radio(s) 120, display(s) 122, input/output devices 124, and/or camera(s) 126. The GPU(s) 118 may be used to perform graphical processing operations or other general purpose operations, such as load balancing with the CPU(s) 106. The radio(s) 120 may include any type of wireless communication device that includes a receiver, transmitter, and/or a transceiver. For example, the radio(s) may include one or more of a Wi-Fi radio, a mobile communications radio (3G, 4G, etc.), a Bluetooth® radio, a global positioning system (GPS) radio, a radio frequency identification (RFID) reader or other types of radios. The display(s) 122 may include liquid crystal displays, electronic ink displays, or other types of displays capable of displaying text, images, and/or video. The input/output device(s) 124 may include, without limitation, audio, speakers, a microphone, storage drives such as CD/DVD/Blue Ray®, flash memory, compact storage, a wired network adapter, and so forth. The camera 126 may include one or more still image or video cameras. In addition, the devices 100 may include a power source 128 to provide power to operation the various components 102.

Various processes, instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the CPU(s) 106, as hardware, and/or as firmware. Typically, the functionality of the program modules may be combined or distributed as desired in various embodiments. An implementation of these modules and techniques may be stored on or transmitted across some form of computer-readable media.

Figure 2:
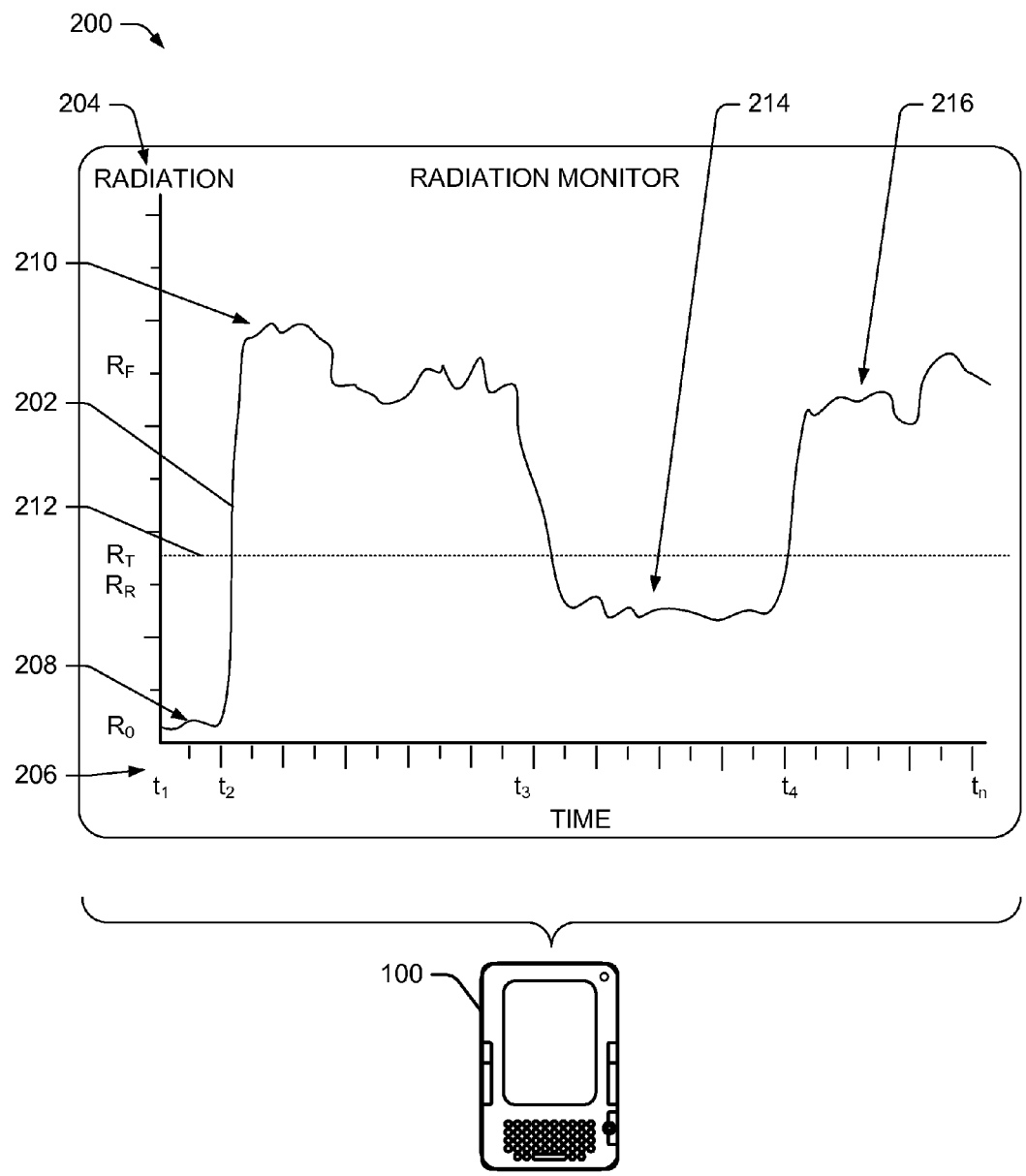
FIG. 2 is a schematic diagram of an illustrative radiation monitor that shows radiation emitted from a computing device that operates in a reduced operational mode.

FIG. 2 illustrates a radiation chart 200 that shows representative levels of radiation 202 emitted from one of the computing devices 100 (device 100) during operation in various operational modes, including a reduced operational mode. The radiation may be measured by a radiation measurement device, which may be exposed to the device 100. The radiation may be electro-magnetic (E-M) radiation or other types of radiation. In some embodiments, the radiation measurement device may be used in conjunction with the device 100 to determine compliance with an operational mode for a particular environment or zone.

The radiation chart 200 includes a plot of radiation (R) 204 over time (t) 206. Various operational states (or modes) are shown in the chart 200 by the illustrative levels of radiation 202 for an example operation of the device 100 between times $t_1$ and $t_n$. The radiation 202 may be intentional or incidental radiation that is emitted from operation of the various components 102 of the device 100.

At time $t_1$, the device 100 may be in a low power mode or powered off. In this state, the device 100 may generate a level of radiation of approximately $R_0$, which is represented by an illustrative low power segment 208 on the chart 200. The radiation level of $R_0$ may be greater than zero radiation because some of the components 102 may still require power consumption and/or otherwise emit small levels of radiation from the device 100 even when components are powered off.

At time $t_2$, the device 100 may resume a full operational mode that may include a level of radiation of approximately $R_F$, which is represented by an illustrative full power segment 210 on the chart 200. The radiation level of $R_F$ may vary based on use of various ones of the components 102 during operation between times $t_2$ and $t_3$. For example, during the operation, the device 100 may vary the power of the CPU(s) 106 and GPU(s) 118, activate or deactivate input/output devices, adjust display settings, perform transmission or receipt of data via the radio(s), or perform other functions using the various components 102, thereby producing different levels of radiation.

In accordance with various embodiments, the level of radiation $R_F$ may be greater than a threshold level of radiation 212 denoted by $R_T$. The threshold level of radiation $R_T$ 212 may be a predetermined amount of radiation that is acceptable for a particular operational environment based on an operational policy. For example, a level of $R_T$ may be a threshold level of radiation allowed during takeoff and landing of commercial aircraft, during operation in a hospital environment, in a laboratory, or in other environments that may desire to limit an amount of radiation emitted by the device 100.

At time $t_3$, the device 100 may initiate a reduced operational mode that may include a level of radiation of approximately $R_R$, which is represented by an illustrative reduced power segment 214 on the chart 200. The reduced operational mode may be initiated by the operational mode application 114, which may receive a signal (e.g., from a beacon, etc.) or command (e.g., from a user, administrator, the device 100, etc.) to initiate the reduced operational mode. The operational mode application 114 may reduce power to and/or deactivate one or more of the components 102 to achieve the reduced power radiation $R_R$. For example, the operational mode application 114 may power off one or more of the radio(s) 120, the GPU(s) 118, cores of the CPU(s) 106, or other components to reduce the radiation from $R_F$ to $R_R$. As shown in the chart 200, the reduced level of radiation $R_R$ is less that the threshold level of radiation $R_T$, which may allow operation of the device 100 in an environment which imposes restrictions on radiation output of computing devices.

At time $t_4$, the device 100 may resume a full operational mode that may include a level of radiation of approximately $R_F$, which is represented by an illustrative full power segment 216 on the chart 200. For example, the operational mode application 114 may resume the full operational mode following a second signal from a beacon, a predetermined duration of time, a user input (e.g., access code, etc.) or by other means. The operational mode application 114 may restore full power to and/or reactivate one or more of the components 102 to achieve the full operational mode that includes a corresponding full power level of radiation $R_F$. For example, the operational mode application 114 may power on one of the radios 120, the GPU(s) 118, or other devices that were powered off during the reduced operational mode represented by the segment 214 in the chart 200.

Figure 3:
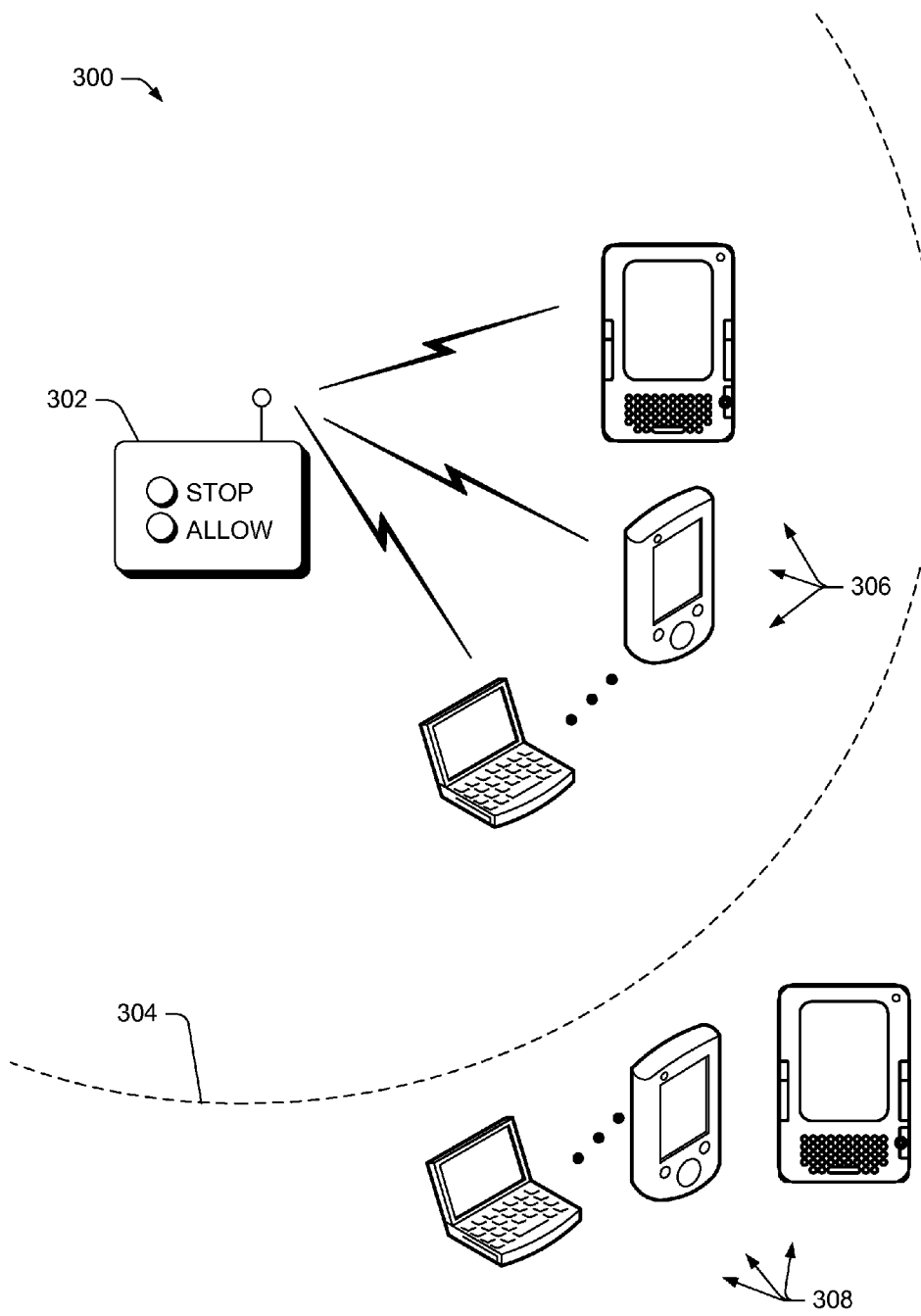
FIG. 3 is a schematic diagram of an illustrative environment where a beacon communicates with various computing devices to controllably initiate a reduced operational mode for the computing devices within a predetermined zone.

FIG. 3 shows an illustrative environment 300 where a beacon 302 communicates with various computing devices to controllably initiate a reduced operational mode for the devices within a predetermined zone 304. As shown in the environment 300, the beacon 302 may transmit a signal that may be received by devices 306 that are within the predetermined zone 304. The predetermined zone may be controlled by the power of the signal from the beacon, by insulating walls, or by other features that prevent over extending transmission of the signals past the predetermined zone 304.

In some embodiments, the beacon 302 may be a dedicated controller that may transmit a first signal to initiate the reduced operational mode via the operational mode application 114. Later, the beacon 302 may send a second signal that may discontinue the reduced operational mode via the operational mode application 114, and thereby may allow the device to resume the full operational mode. In various embodiments, the beacon 302 may transmit a continual signal, which when received by the operational mode application 114, may act to set operation in the reduced operational mode. When the signal is no longer transmitted, then the operational mode application 114 may resume the full operational mode. In some embodiments, the beacon 302 may not be a dedicated device, but rather may be a transmitter used in a particular environment. For example, the beacon 302 may be a transmitter in a commercial aircraft that is used to transmit a location of the aircraft for collision avoidance while an aircraft is near or at an airport or another type of transmitter used in a particular environment. In various embodiments, the beacon may transmit signals in specific frequencies which are detectable by the device 100. For example, the aircraft communications may be transmitted over a specific frequency, which may be detectable by the device 100 when tuned to the proper frequency. The device 100 may be updated, via software enhancements, etc., to identify specific frequencies or other variations of the beacons.

As further illustrated in the environment 300, some devices 308 may be located outside of the predetermined zone 304, and thus not subject to receipt of the signal from the beacon. The devices 308 may continue to operate in a full operational mode under operation by the operational mode application 114 even when the devices 306 are forced to operate in the reduced operational mode by the operational mode application 114. For example, the devices 308 may be located within an airport terminal while the devices 306 are located within an aircraft that is at a gate on the tarmac of an airport.

Illustrative Operation

Figure 4:
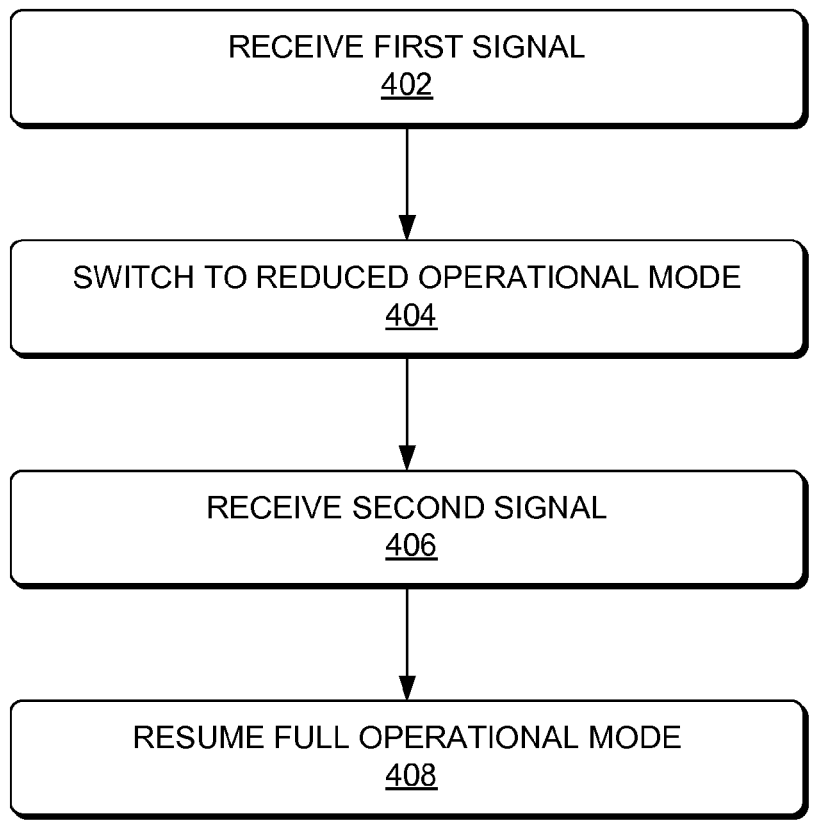
FIG. 4 is a flow diagram of an illustrative process to change modes of operation of a computing device.

FIG. 4 shows an illustrative process 400 to change modes of operation of the computing devices 100. The process 400 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 400, shall be interpreted accordingly.

The process 400 includes operations that may be performed by one or more of the devices 100. The process 400 is described below as being implemented by the operational mode application 114. However, the process 400 may also be implemented by other modules, applications, or combinations that are run by the devices 100. Further, the process 400 describes various operations that may be represented by the segments 210, 214 and 216 that are described with reference to FIG. 2.

At 402, the operational mode application 114 may receive a first signal. The first signal may be a signal that is received by the device 100, such as a radio signal received by one of the radio(s) 120. In various embodiments, the beacon 302 of the environment 300 may transmit a signal that is received by one of the radios 120 and then communicated to the operational mode application 114. For example, the beacon may be on an aircraft, in a concert hall or classroom, or in another location that may have an operational policy for computing devices. In some embodiments, the first signal may be a user input of a command, and thus originate at the device 100 rather than from an external radio transmitter. For example, a flight attendant may ask passengers to activate this feature on their devices. In various embodiments, the first signal may be sensed information from the device 100, which may be collected via one of the components 102. In some instances, the sensed information may be a location that is discoverable via a GPS receiver, triangulation using a mobile communications radio, an RFID reader, or another one of the components 102. For example, the device 100 may sense the signal in a classroom, a museum, etc., and then disable one or more of the components 102.

At 404, the operational mode application 114 may switch operation of the device 100 from the full operational mode to the reduced operational mode based at least in part on the receipt of the first signal. For example, as shown at time $t_3$ in FIG. 2, the operational mode application 114 may reduce power to one or more of the component 102 via the component drivers 116 so that these components begin operation in a low power mode or are turned off, thereby reducing an overall emission of radiation from the device 100 and/or restricting use of these components. In some embodiments, the operational mode application 114 may reduce radiation output of the components or otherwise alter operation of the components. For example, a camera may be capable of recording still imagery and video. In some instances, an altered operation of the camera may disable use of video recording while allowing use of still imagery recording by the camera.

At 406, the operational mode application 114 may receive a second signal. The second signal may be received by the device 100 using a same or different component as used to receive the first signal in the operation 402. In some embodiments, the second signal may be received from a same source as the first signal (e.g., the beacon 302) or may be a user input of another command, and thus originate at the device 100. In various embodiments, the second signal may be an absence or termination of the first signal when the first signal is a continuing signal. In some embodiments, the second signal may be sensed information from the device 100, which may be collected via one of the components 102. For example, the second signal may be a new location that is discoverable via the GPS receiver or another one of the components 102.

At 408, the operational mode application 114 may resume the full operational mode based at least in part on receipt of the second signal. The operational mode application 114 may restore power to the components 102 that experienced a reduction of power at the operation 404.

Figure 5:
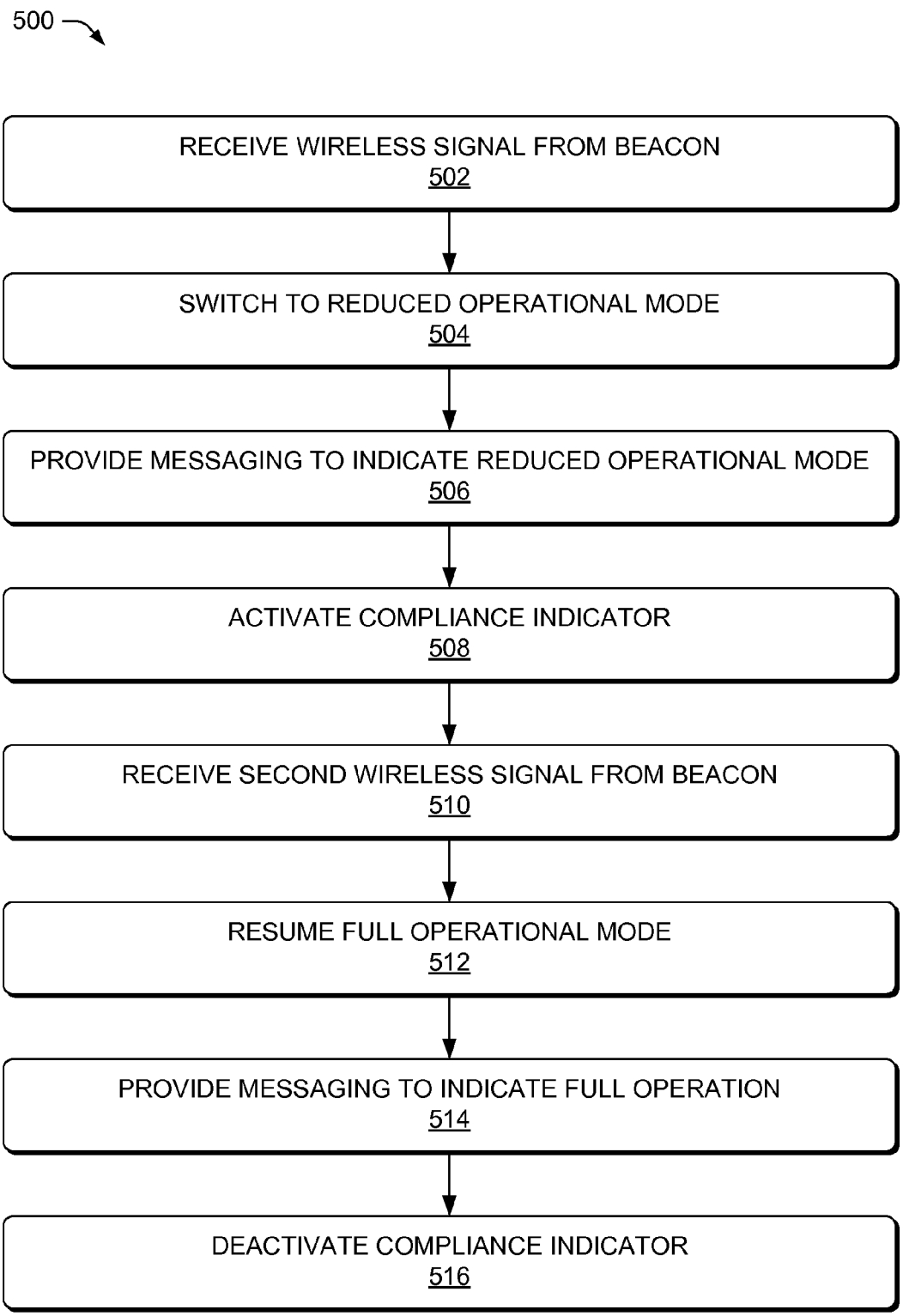
FIG. 5 is a flow diagram of an illustrative process to initiate a reduced operational mode in response to receipt of a wireless signal from a beacon.

FIG. 5 shows an illustrative process 500 to initiate a reduced operational mode in response to receipt of a wireless signal from a beacon. For example, the process 500 may operate in the environment 300 shown in FIG. 3. The process 500 is described below as being implemented by the operational mode application 114 that is run by the device 100 and describes various operations that may be represented by the segments 210, 214 and 216 that are described with reference to FIG. 2.

At 502, the device may receive a wireless signal from a beacon, such as the beacon 302. The wireless signal may be received via one of the radio(s) 120, such as a Wi-Fi radio, a mobile communications radio (3G, 4G, etc.), a Bluetooth® radio, or another type of radio.

At 504, the operational mode application 114 may switch to the reduced operational mode from another mode of operation of the device 100 in response to the received wireless signal.

At 506, the operational mode application 114 may provide messaging to indicate use or implementation of the reduced operational mode. For example, the message may be include text, audio, and/or an image that indicates to the user of the device 100 that the device is now operating in the reduced operational mode, which is shown in an illustrative user interface in FIG. 11. In addition, the message may indicate what components, if any, are operating at reduced power or have been turned off.

At 508, the operational mode application 114 may activate a compliance indicator. The compliance indicator may provide a continuous indication while the device 100 operations in the reduced operational mode. For example, the compliance indicator may be a light or graphic that is activated when the device is operating in the reduced operational mode, which may provide an indication to the user and other people, such as flight attendants, proctors, or other interested people.

At 510, the operational mode application 114 may receive a second wireless signal from a beacon, which may be the beacon 302 or a different beacon.

At 512, the operational mode application 114 may restore operation of the device in the full operational mode based at least in part on the receipt of the second signal.

At 514, the operational mode application 114 may provide messaging to indicate operation in the full operational mode. In some embodiments, the messaging may be similar to the messaging from the operation 506. In various embodiments, the messaging may be intended to notify others of the restoring of operation of the device to the full operational mode. For example, when the restoring to the full operation is possible via a user command, other people may desire to know when the device operation is restored to the full operational mode. Thus, the device 100 may temporarily emit a loud sound, flash a light, or provide another message that may be received by others when the device returns to the full operational mode, thereby notifying others of the change in the operational state. This feature may enable others, such as flight attendants, proctors, or other interested people to quickly determine compliance with applicable operational polices that relate to the various modes of operation of the device controlled by the operational mode application 114.

At 516, the operational mode application 114 may deactivate the compliance indicator to communicate that the device has returned to operation in the full operational mode.

Figure 6:
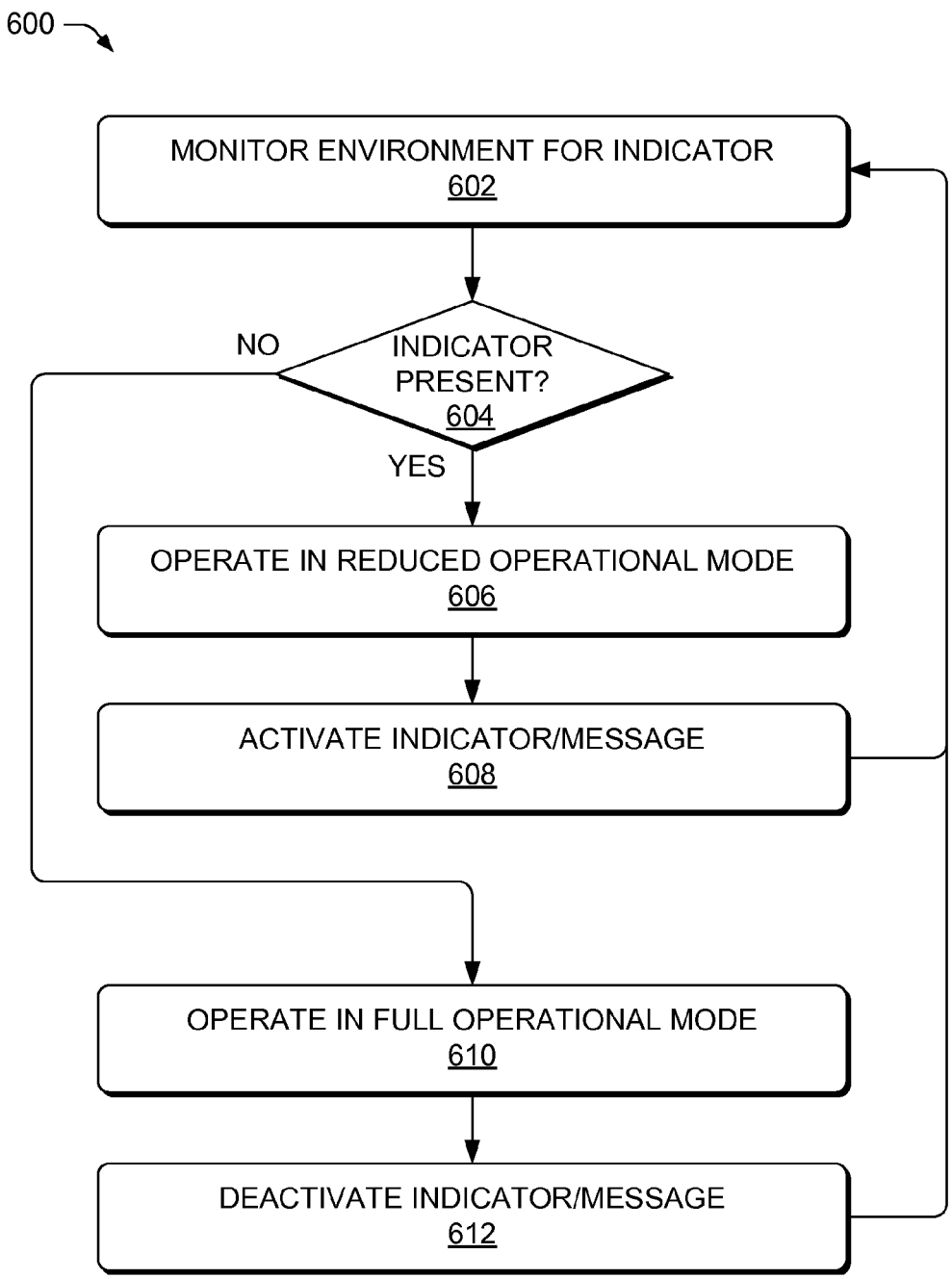
FIG. 6 is a flow diagram of an illustrative process to monitor an environment for an indicator and selectively initiate a reduced operational mode based on a presence or absence of the indicator.

FIG. 6 shows an illustrative process 600 to monitor an environment for an indicator and selectively initiate a reduced operational mode based on a presence or absence of the indicator. The process 600 describes control of the operation of the device 100 by the operational mode application 114 using a loop process that places the device in the reduced operational mode when an indicator is present, such as a continuous signal, data that falls within predetermined thresholds, or other types of information that may be monitored. The signal may be present in a restricted-use zone and not present when outside of the restricted-use zone.

At 602, the operational mode application 114 may monitor an environment for occurrence of an indicator that, when located or present, initiates or maintains operation of the device 100 in the reduced operational mode. The indicator may be presence of a signal, such as a radio signal from a transmitter or transceiver. In some instances, the signal may be a constant or substantially constant signal. For example, periodic radio communications from an aircraft radio may act as the indicator. In some embodiments, a location of the device, as determined by one or more of the components 102 (e.g., GPS receiver, etc.) may identify the indicator, such as a location of the device at an airport or another restricted-use zone or location. In various embodiments, a presence (or absence) of a particular level of radiation may act as an indicator when detected by the device 100. For example, radiation that is emitted in a hospital, laboratory, etc. may act as the indicator and may be used to disable or reduce a radiation output of the device while the indicator is present.

At 604, the operational mode application 114 determines whether the indicator is present. When the indicator is present at 604 (i.e., the "yes" branch), the operational mode application 114 may instruct the device 100 to operate in a reduced operational mode at 606. In accordance with various embodiments, the operational mode application 114 may initiate operation of the device 100 in the reduced operational mode after observance of the indicator at 602 via the decision operation 604. At 608, the operational mode application 114 may present a message and/or compliance indicator, such as those discussed above in the operations 506 and 508 of the process 500.

When the indicator is not present at 604 (i.e., the "no" branch), the operational mode application 114 may allow the device 100 to operate in a full operational mode at 610. For example, after the indicator is not sensed at 602 for a predetermined amount of time, which may account for any allowable omission of the indicator (e.g., radio transmissions in aircraft, etc.), then the operational mode application 114 may restore the full operational mode. At 612, the operational mode application 114 may deactivate the compliance indicator and/or provide messaging to indicate the restoring of the full operational mode.

Figure 7:
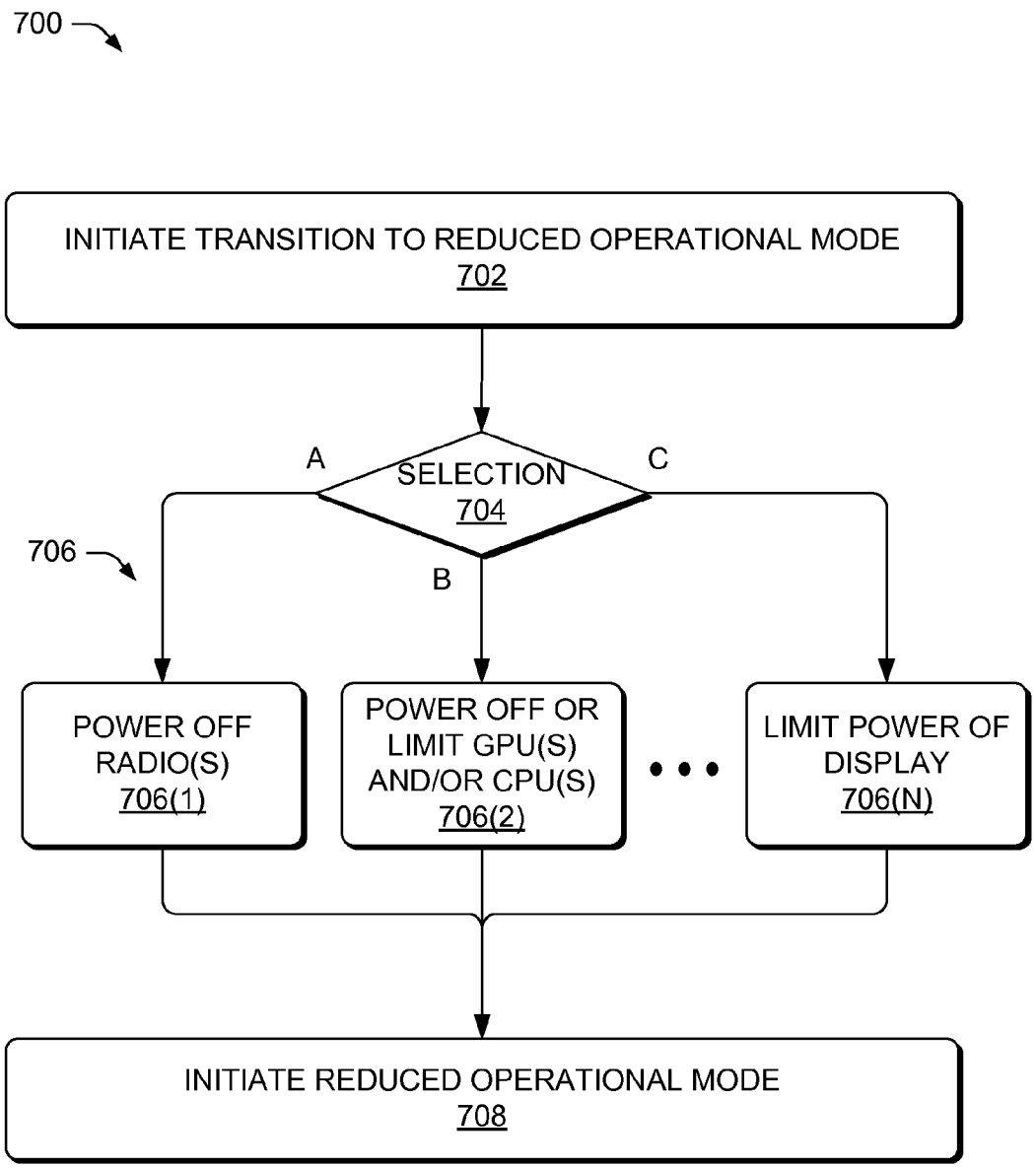
FIG. 7 is a flow diagram of an illustrative process to select components and then turn power off or reduce power of the selected components to initiate the reduced operational mode.

FIG. 7 shows an illustrative process 700 to select components and then turn power off or reduce power to the selected components to initiate the reduced operational mode. The process 700 provides illustrative techniques to enable the operational mode application 114 to transition from the full operational mode to the reduced operations mode or vice versa.

At 702, the operational mode application 114 may initiate transition to the reduced operational mode, which may be achieved by powering off and/or reducing power of one or more of the components 102 of the device 100.

At 704, a decision operation may select one or more possible operations 706 to reduce power or power off one or more of the components 102. Following a route "A", at 706(1), the operational mode application 114 may power off one or more of the radio(s) 706. Following a route "B", at 706(2), the operational mode application 114 may power off or limit power to the GPU(s) 118 and/or CPU(s) 106. Following a route "C", at 706(N), the operational mode application 114 may limit an intensity of the display 122 by reducing power to the display. The operations 706(1)-(N) are not exhaustive, and other operations may be selected by the operational mode application 114 to transition the device 100 from the full operational mode to the reduced operational mode as described in the preceding description. For example, the operational mode application 114 may also disable, reduce power, or power off other ones of the various components 102 such as the camera(s) 126 or input/output device(s) 124.

At 712, following selection and implementation of one or more of the operations at 706, the operational mode application 114 may initiate the reduced operational mode. In order to return to the full operational mode, the operational mode application 114 may restore power to the components selected via the decision operation 704.

Figure 8:
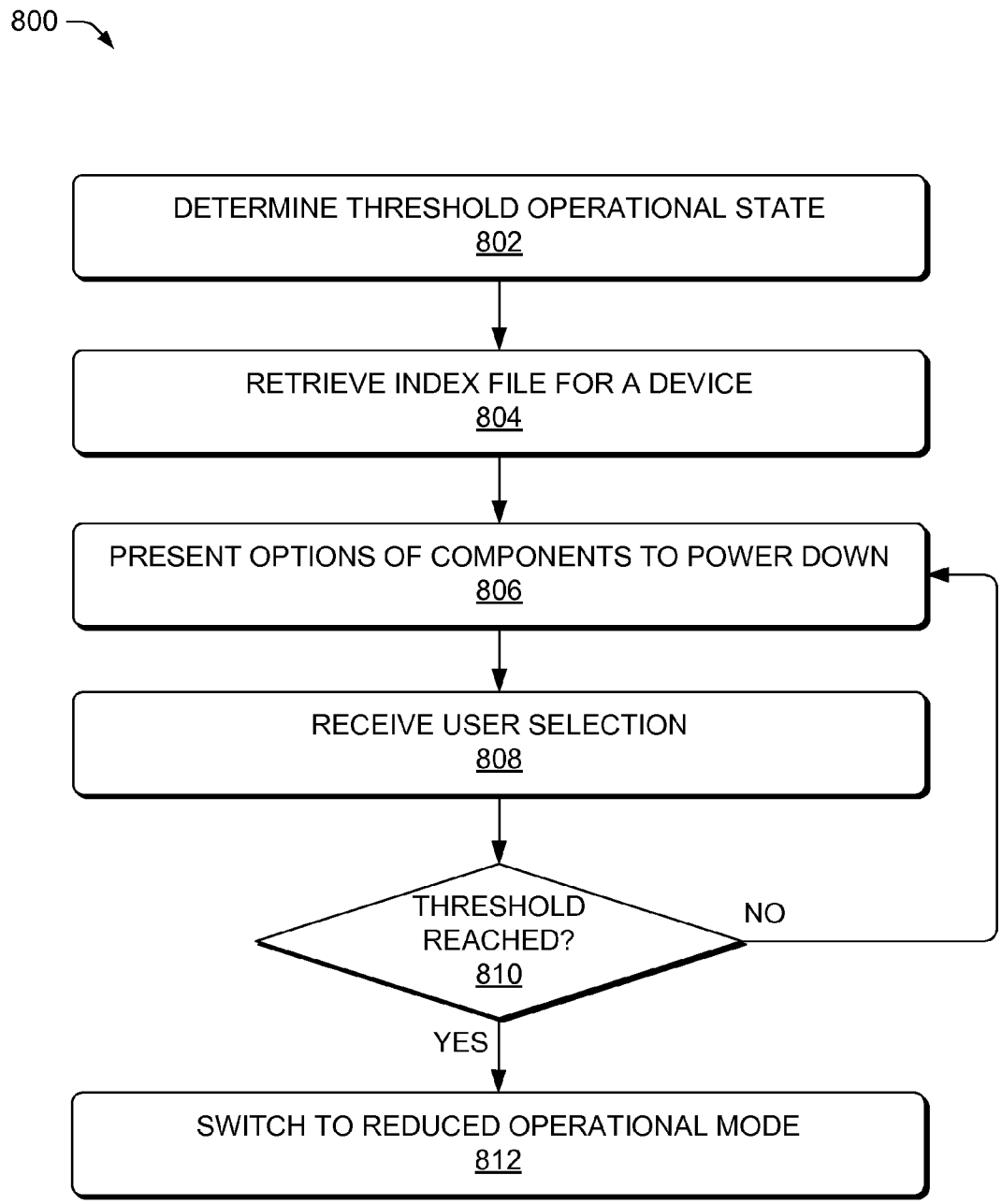
FIG. 8 is a flow diagram of an illustrative process to enable user selection of components that experience reduced power during the reduced operational mode.

FIG. 8 shows an illustrative process 800 to enable user selection of components that experience reduced power during the reduced operational mode. The process 800 may use the index file 110 that may be included in the data 108 as discussed with reference to the environment 100. The index file 110 may associate a radiation output with an operational state of at least a portion of the components 102. When the operational mode application 114 is used to power down various components to achieve an operation of the device that emits less than a threshold amount of radiation (e.g., less than $R_T$ as shown in FIG. 2), then the index file 110 may be used to assist in user selection of the components via the process 800 until the expected radiation output falls below the threshold based on data in the index file. An example of the index file 110 is provided in Table 1. The values of the expected radiation output may be generated by testing operation of the device while measuring the radiation output.

TABLE 1

| Component Name | Expected Radiation Output ($X_n$ being a sample value of radiation) |
| --- | --- |
| Wi-Fi Radio | $X_1$ |
| 3G Radio | $X_2$ |
| . . . | . . . |
| Dim Monitor to 50% | $X_3$ |

At 802, the operational mode application 114 may determine a threshold operational state 802 that is to be achieved for operation of the device in a restricted area, such as in an aircraft or laboratory. The threshold value may be stored in the operational mode application 114 or provided by another source, such as the beacon discussed in the process 500.

At 804, the operational mode application 114 may retrieve the index file 110. The index file 110 may be associated with the device or a model of the device such that the values in the index file represent empirical data for the device or a similar device.

At 806, the operational mode application 114 may present options of components to the user that, when selected and powered down (e.g., off or reduced power), may achieve a reduction in the radiation output corresponding to the values in the index file 110. Some components may include various options, such as to completely power off, to power at 50%, to power at another level (when applicable), to reduce radiation output below a threshold, etc. By reducing the radiation output of one or more components, the device may achieve operation at or below a threshold value of radiation output. In some embodiments, some components may not be selectable by the user, such as components that are mandatory to reduce radiation output, have to be disabled due to an operational policy, etc.

At 808, the operational mode application 114 may receive user selection of one or more components that are presented at the operation 806. For example, a user may select to reduce the power of a monitor by 50% and turn off a 3G radio transmitter, each having associated expected radiation output values.

At 810, the operational mode application 114 may determine whether user selections that are received at the operation 808 enable the device to achieve operation below the threshold emission value. When the threshold is not reached, (following the "no" route) the user may be prompted to select additional or different components at the operation 806. When the threshold is reached, (following the "yes" route) the operational mode application 114 may switch the operational state of the device to the reduced operational state based at least in part on the received selections from the operation 808.

Figure 9:
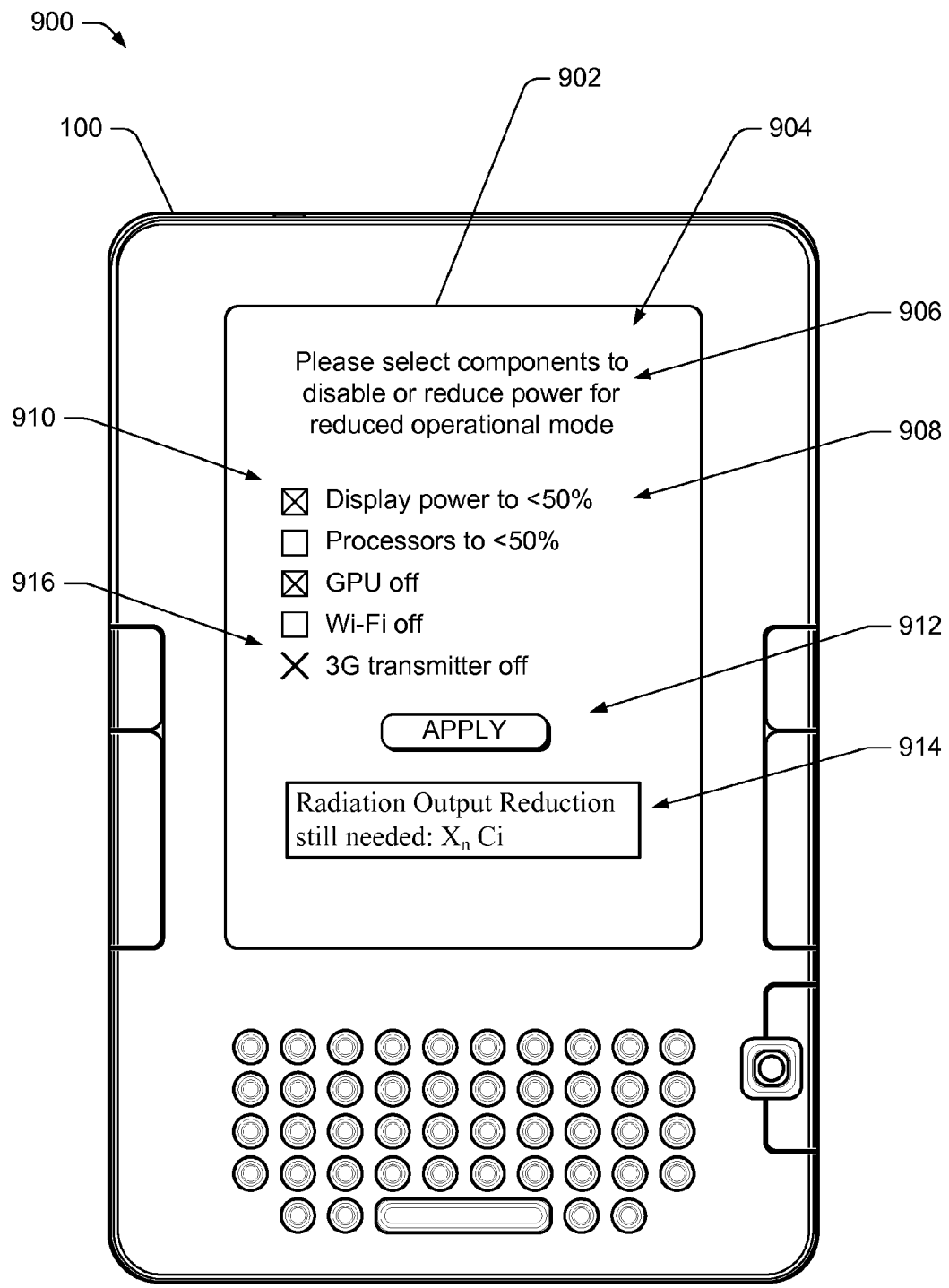
FIG. 9 is an illustrative user interface (UI) 900 that lists components that are selectable by a user to set operation of the device in the reduced operational mode.

FIG. 9 shows an illustrative user interface (UI) 900 that lists components that are selectable by a user to set operation of the device in the reduced operational mode. The device 100, as shown in FIG. 9, includes a display 902 that may be used to generate a selection page 904. The selection page 904 may include a message 906 to instruct a user to select one or more components in a list of components 908, which when selected using corresponding selectors 910, results in a deactivation, reduced power, or powered off state of the selected component. After selection of the component(s), the selected component(s) may experience a reduced power state (e.g., disabled, reduced power, no power, reduced radiation output, etc.) to achieve the reduced operational mode. The selection page 904 may include a command 912 to activate or apply the selections to achieve a threshold 914, which may be communicated to the user. When the user does not select enough components or the selected components do not achieve the threshold 914, the user may be prompted to select additional components or different components via another instance of the message 906. After another user selection and re-execution of the command 912, the selected component may again be compared to the threshold in accordance with the process 800 described above until the threshold is achieved by the selection. Some components 916 may be automatically selected by the operational mode application 114 and thus not eligible for user selection (e.g., no selection box in UI, grayed out, etc.).

Figure 10:
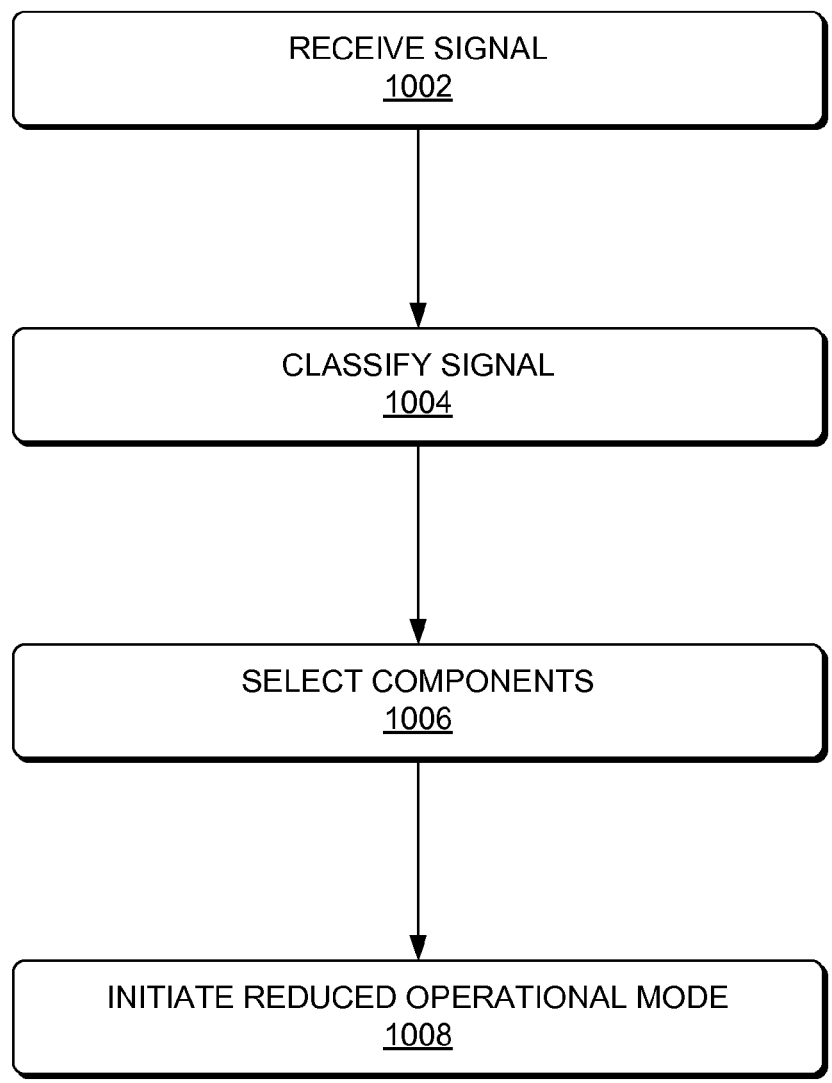
FIG. 10 is a flow diagram of an illustrative process to classify a signal and select components for a reduced operational mode based on the classification of the signal.

FIG. 10 shows an illustrative process 1000 to classify a signal and select components for a reduced operational mode based on the classification of the signal. By classifying signals, the operational mode application 114 may determine which of the components 102 are to experience a reduction of power, radiation output, or other alteration of operation.

At 1002, the operational mode application 114 may receive a signal, which may be a wireless signal, a measured level of radiation, or other types of signals.

At 1004, the operational mode application 114 may classify the signal based on characteristics of the signal, such as an amount of radiation, frequency of signal, etc. The classification may be used to map to an index file that stores information for each classification (e.g., the index file 110, etc.). For example, each classification may be mapped to a threshold radiation level, a restriction of particular components (e.g., disable transmitters, etc.), and so forth, and thus influence operation of the components in the reduced operational mode. The signals may be classified using number, letters, or other classification techniques.

At 1006, the operational mode application 114 may select components to disable, reduce power to, reduce radiation output, or otherwise alter the operation of in accordance with the classification of the signal. For example, the index file may provide a value for the threshold radiation level or a list of components that are to be disabled based on the classification.

At 1008, the operational mode application 114 may initiate the reduced operational mode by altering operation (e.g., reducing power, reducing radiation output, restricting features, etc.) of the selected components from the operation 1006.

In an example, various signals having different classifications may be emitted during a flight. A first signal may include a classification that, when mapped to the index file, restricts use of components to comply with a takeoff protocol, a second signal may include a classification that, when mapped, permits use of some components and restricts use of others to comply with an in-flight protocol, and so forth. Thus, classification of signals may be used to cycle the operational mode of the device 100 through various modes corresponding to a particular classification of a signal used to initiate the operational mode.

Example Implementations

The following examples are provided to further illustrate operation of the operational mode application 114 in accordance with the various processes 400, 500, 600, and 700 described above.

In a first example, the operational mode application 114 may operate in an aircraft mode to enable use of the device 100 during otherwise restricted times, such as during takeoff and landing procedures. In this particular example, the device 100 is implemented as an electronic book (eBook) reader device although other devices could also be used in this example.

Returning to the process 500, the wireless signal may be received from a beacon under control of the aircraft, which when received by the device at 502, may cause the operational mode application 114 to switch to the reduced operational mode at 504. In this example, a beacon may be activated at the beginning of takeoff procedures, such as after the main cabin door is closed. The eBook reader device may turn off a mobile communications radio, such as a 3G radio, under control of the operational mode application 114. After the eBook reader device enters the reduced operational mode, radiation emitted from the device may be less than a predetermined threshold amount that is established by the FAA, which may enable use of the device in accordance with FFA rules.

To ensure that the device is complying with aircraft protocol, flight attendants may randomly verify that the devices 100 are actually operating in the reduced operational mode (e.g., with the mobile telecommunications radio off). The compliance indicator, which is activated at 508 may provide this indication to the flight attendants that the device is in the reduced operational mode. In addition, the user may receive a message at 506 that informs her that the mobile communications radio has been disabled during the flight or a portion of the flight.

In some embodiments, the flight attendants may use a detection device (e.g., the radiation measurement device, etc.), as described with reference to FIG. 2, to determine whether devices are compliant with aircraft protocol (or other policies or rules), such as by using the detection device to identify devices that are not operating in the desired operational mode (e.g., still have powered transmitters, etc.). In various embodiments, the detection device may be integrated in an accessory, such as a cover for the device 100, and indicate the mode of the operation of the device via a compliance indicator and/or message (light, color, sound, etc.).

When the aircraft arrives at a destination or during another point in time, the flight crew may use the beacon to transmit a second signal, which may restore operation of the eBook to the full operational mode at 512.

In some instances, the reduced operational mode may include turning off all wireless communications. In this scenario, the operational mode application 114 may receive an indicator other than a wireless signal to enable restoring the operation of the device to the full operational mode. The operational mode application 114 may restore the operation to the full operational mode after a predetermined delay (e.g., 30 minutes, based on the length of flight possibly including an extra allowance, etc. In some instance, the user may unlock the operational mode application 114 by inputting a code provided by the flight crew. In yet another instance, the user may freely instruct the operational mode application 114 to restore the full operational mode, but such restoring may include a loud sound at 514, which may alert the flight crew if the person restores the full operational mode during the restricted period.

In a variation of the first example, the eBook may determine the device is in a restricted space (e.g., in a classroom, a school, a museum, in an airplane, etc.) using sensor data such as GPS data. The operational mode application 114 may then initiate the reduced operational mode until the eBook determines the device is no longer in the restricted space.

In a second example, the operational mode application 114 may operate in an exam mode to enable use of the device 100 during an exam. In this particular example, the device 100 is implemented as tablet computer although other devices could also be used in this example. The tablet may operate in accordance with the process 600. At the beginning of the exam, the proctor may turn a beacon on, which emits a signal during the exam. The signal may be continuous or pulsed during intervals. The operational mode application 114 may identify the beacon as the indicator at 604 and begin operation in the reduced operational mode at 606. The operational mode application 114 may disable the radios 120, specific ones of the programs/modules 112, or other ones of the components 102 of the device 100. When the exam is complete, the proctor may deactivate the beacon, which may terminate the indicator. When the operational mode application 114 determines that the indicator is no longer present at 604, the operational mode application 114 may restore the full operational mode of the tablet.

In a third example, the operational mode application 114 may operate in a museum mode to enable use of the device 100 during a visit to a gallery in a museum. In this particular example, the device 100 is implemented as mobile telephone although other devices could also be used in this example. The mobile telephone may operate in accordance with the process 600. At 606, when the operational mode application 114 initiates the reduced operational mode, the operational mode application 114 may disable input/output devices (e.g., a microphone to prevent voice communications, etc.) and the camera 126. This may allow the person to use other functionality that may be permitted by the museum, such as use of text messaging, speakers for an audio tour, or a web browser. Similarly, a concert mode may also disable cameras, restrict use of a camera for only still imagery (prevent use of video recording) and other appropriate components.

Illustrative Messaging

Figure 11:
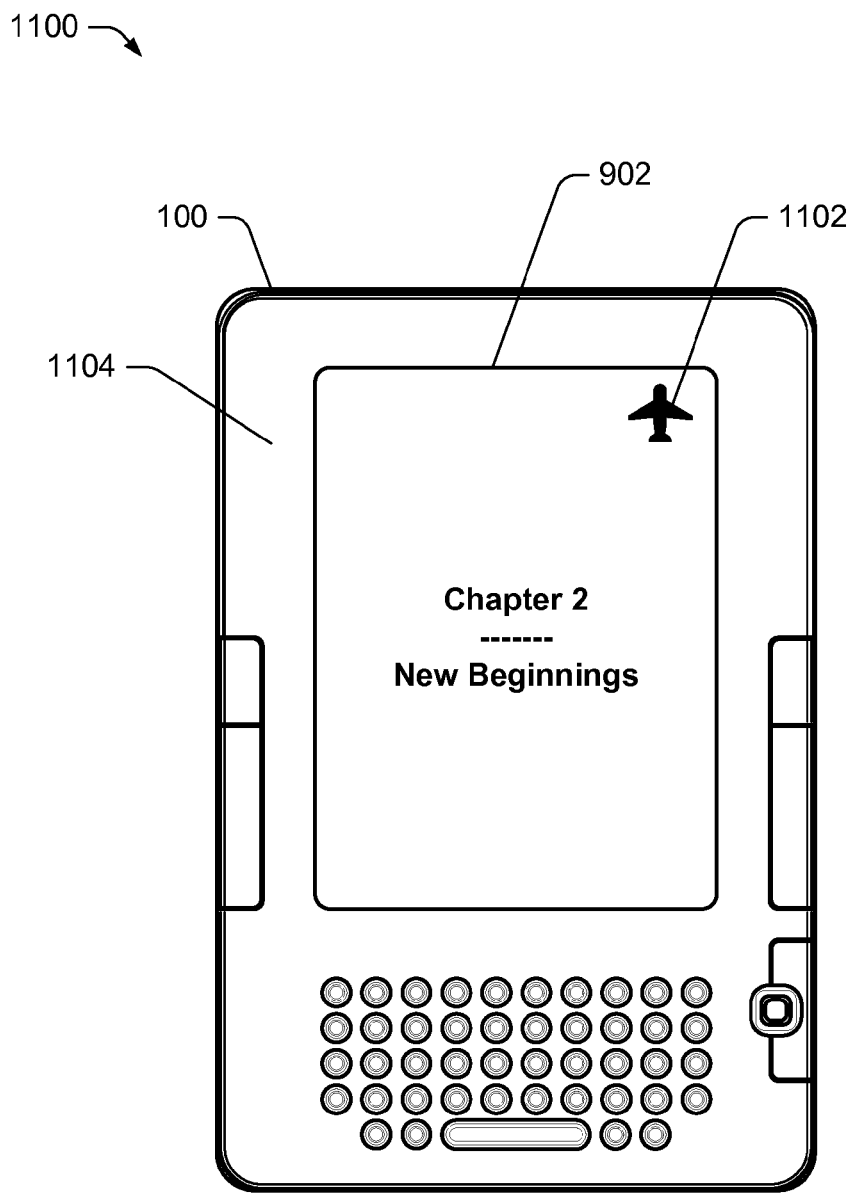
FIG. 11 is an illustrative UI that includes a compliance indicator associated with operation in the reduced operational mode.

FIG. 11 shows an illustrative UI 1100 that includes a compliance indicator associated with operation of the device in the reduced operational mode. In accordance with one or more embodiments, a compliance indicator 1102 may be a visual cue that indicates that the device 100 is operating in the reduced operational mode. For example, the compliance indicator 1102 may be activated at the operation 508 in the process 500. Thus, the presence or lack of presence of the compliance indicator 1102 can be used to determine the operational mode of the device 100. The compliance indicator 1102 may be implemented as an icon, picture, font style, background color, device housing appearance or any other representation on the display 902 or on other locations of the device 100, such as in a housing 1104 or an accessory. For example, an accessory for the device 100 may be used to show the compliance indicator, such as an accessory cover that includes data connectivity with the device 100 (e.g., via a data port, wireless communication, etc.). In some embodiments, the compliance indicator 1102 may be displayed by an application, such as an eBook reading application or a browser, among other possible applications, when the device is operating in the reduced operational mode. By displaying the compliance indicator 1102 on the display as a rendered image, a device may be retrofitted with the operational mode application 114, such as via a downloadable application, and may include the compliance indicator 1102 without a change to existing hardware.

Figure 12:
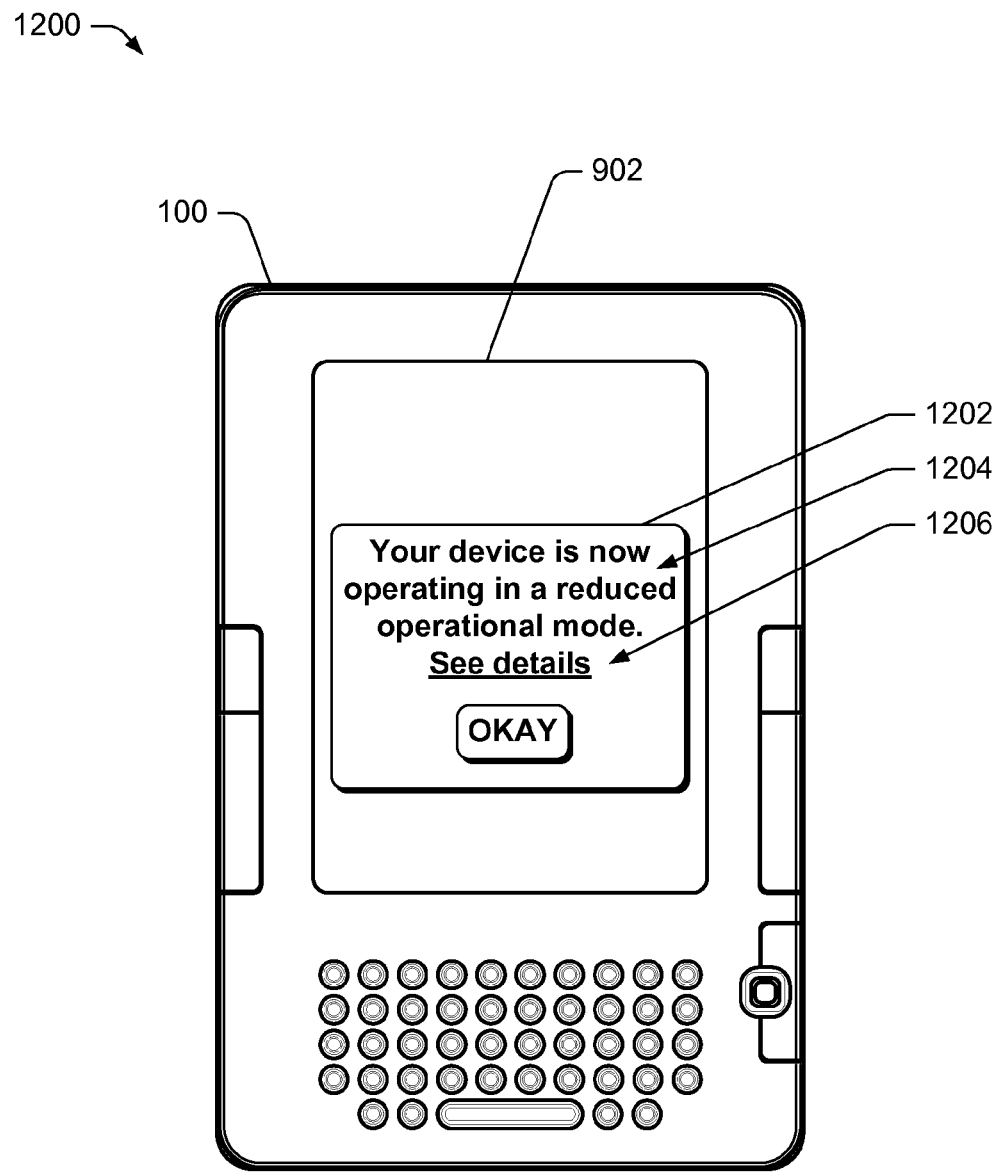
FIG. 12 is an illustrative UI that includes a message about the reduced operational mode.

FIG. 12 shows an illustrative UI 1200 that includes a message about the reduced operational mode. A message 1202 may be presented in the display 902 after initiation (or possibly termination) of the reduced operational mode, such as at the operation 506 in the process 500. The message may include an explanation 1204. In some instances, the message may include a selector 1206 that enables the user to determine additional details, such as the components that are affected by the reduced operational mode.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A mobile computing device comprising:
a processor;
a plurality of components that perform functions of the mobile computing device under control of component drivers executable by the processor, the components to include at least a display; and
memory to store the component drivers and an operational mode application executable by the processor, the operational mode application, when executed, to perform acts comprising:
receiving a first indication from a remote entity to initiate implementation of a reduced operational mode of the mobile computing device, the first indication including a threshold radiation level;
switching, in response to receipt of the first indication, from a full operational mode to the reduced operational mode by temporarily reducing a radiation output of one or more of the plurality of components to a level that is less than the threshold radiation level included in the first indication received from the remote entity;
presenting a compliance indicator to indicate that the mobile computing device is operating in the reduced operational mode;
receiving a second indication to initiate recommencement of the full operational mode; and
resuming, in response to receipt of the second indication, the full operational mode.

2. The mobile computing device as recited in claim 1, wherein the switching from the full operational mode to the reduced operational mode includes temporarily disabling at least one of a mobile telecommunications radio or a graphics processing unit (GPU).

3. The mobile computing device as recited in claim 1, wherein the mobile computing device is an electronic book (eBook) reader device and the reduced operational mode allows at least rendering of text on the display of the eBook reader device.

4. The mobile computing device as recited in claim 1, wherein the acts further comprise measuring the radiation output of the one or more of the plurality of components to determine if the level is less than the threshold radiation level included in the indication received from the remote entity.

5. The mobile computing device as recited in claim 1, wherein the first indication and the second indication are generated by a remote beacon that generates a signal.

6. The mobile computing device as recited in claim 1, wherein the first indication and the second indication are at least one of:
a first wireless signal and a second wireless signal, or
a continuous wireless signal that provides the first indication upon initiation of a restricted use time period and that provides the second indication upon termination of the restricted use time period.

7. A method, comprising:
receiving a signal to transition a mobile computing device from a full operational mode to a reduced operational mode;
reducing a radiation output of one or more components of the mobile computing device;

determining that the radiation output of the one or more components satisfies a threshold radiation level associated with the reduced operational mode;

presenting a message after the radiation output is determined to satisfy the threshold radiation level, the message indicating that the mobile computing device is operating in the reduced operational mode; and resuming the full operational mode by restoring a non-reduced radiation output of the one or more components that exceeds the threshold radiation level.

8. The method as recited in claim 7, wherein the reducing the radiation output is performed in response to determining that the mobile computing device is located within a restricted-use zone, and wherein the resuming the full operational mode is performed in response to determining that the mobile computing device is located outside the restricted-use zone.

9. The method as recited in claim 8, further comprising determining a location of the mobile computing device with respect to the restricted-use zone.

10. The method as recited in claim 9, wherein the determining is performed by a global positioning system (GPS) component of the mobile computing device or by triangulation using a mobile communications radio.

11. The method as recited in claim 8, wherein the restricted-use zone is at least one of a museum, a concert hall, or in an aircraft.

12. The method as recited in claim 7, wherein the signal is received from a device external to the mobile computing device, the signal being a wireless signal or detection by the mobile computing device of an electro-magnetic radiation in an environment.

13. The method as recited in claim 7, wherein at least one of the one or more components is a processing unit and the threshold radiation level is set to limit an amount of radiation output by the processing unit to less than a maximum amount of radiation capable of being output by the processing unit.

14. The method as recited in claim 7, wherein at least one of the one or more components is a transmitter and the threshold radiation level is set to limit an amount of radiation output by the transmitter to less than a maximum amount of radiation capable of being output by the transmitter.

15. The method as recited in claim 7, wherein at least one of the one or more components is a display and the threshold radiation level is set to limit an amount of radiation output by the display to less than a maximum amount of radiation capable of being output by the display.

16. The method as recited in claim 7, wherein the reducing the radiation output of the one or more components of the mobile computing device includes disabling at least one component such that the at least one component is not available for use while the mobile computing device is operating in the reduced operational mode.

17. The method as recited in claim 7, wherein the message is a compliance indicator that remains active while the mobile computing device is operating in the reduced operational mode.

18. The method as recited in claim 7, wherein the message communicates the one or more components that are affected by the reduced operational mode.

19. The method as recited in claim 7, further comprising emitting an audible cue to indicate at least one of an initiation of the reduced operational mode or the resuming of the full operational mode.

20. The method as recited in claim 7, wherein the reducing the radiation output is performed in response to determining that the mobile computing device is located in an area implementing a restricted-use time period, and wherein the resuming the full operational mode is performed in response to determining that the restricted-use time period has expired.

21. The method as recited in claim 7, further comprising measuring the radiation output at the mobile computing device prior to determining that the radiation output of the one or more components satisfies the threshold radiation level associated with the reduced operational mode.

22. One or more non-transitory computer-readable media storing computer-executable instructions that, when executed on one or more processors, performs acts comprising:

monitoring data to determine whether a mobile computing device is within a restricted-use zone;

presenting a list of components of the mobile computing device that are eligible for a reduced operational mode after the data initially indicates that the mobile computing device is within the restricted-use zone;

receiving a user selection of one or more components presented in the list of components;

operating the one or more components of the mobile computing device in the reduced operation mode while the data continues to indicate that the mobile computing device is within the restricted-use zone; and operating the one or more components in a full operation mode after the data indicates that the mobile computing device is no longer-within the restricted-use zone.

23. The one or more non-transitory computer-readable media as recited in claim 22, wherein the monitoring is performed by a wireless radio that determines the restricted-use zone by a presence of a signal emitted from a beacon.

24. The one or more non-transitory computer-readable media as recited in claim 22, wherein the monitoring is performed by a global positioning system (GPS) that determines a location of the mobile computing device with respect to the restricted-use zone.

25. The one or more non-transitory computer-readable media as recited in claim 22, wherein the reduced operation mode of the one or more components includes deactivating one or more wireless radios of the mobile computing device.

26. The one or more non-transitory computer-readable media as recited in claim 22, wherein the reduced operation mode of the one or more components includes disabling recording of video by a camera operated by the mobile computing device while enabling recording of still images by the camera.

27. The one or more non-transitory computer-readable media as recited in claim 22, wherein the mobile computing device is an electronic book (eBook) reader device, the restricted-use zone is within an aircraft, and the reduced operation mode of the one or more components includes reducing power to at least one wireless radio.

28. The one or more non-transitory computer-readable media as recited in claim 22, further comprising transmitting a message to indicate the operation of the one or more components in the reduced operation mode while the mobile computing device is within the restricted-use zone.

29. A method, comprising:

receiving a radio signal from a beacon, that instructs a mobile computing device to switch from a full operational mode to a reduced operational mode associated with a threshold power level;

in response to receipt of the radio signal from the beacon, presenting a list of components eligible for a reduction in power to achieve the reduced operational mode;

receiving a selection of one or more components from the list of components presented;

comparing an anticipated power level after reduction of power of the one or more components to the threshold power level based on empirical values of the one or more components stored in an index file;

determining that the anticipated power level satisfies the threshold power level based at least in part on the comparing;

reducing power to the one or more components to initiate the reduced operational mode; and restricting use of the one or more components above the threshold power level during operation in the reduced operational mode.

30. The method as recited in claim 29, further comprising:

receiving another radio signal to return to the full operational mode; and resuming, after receipt of the other radio signal, the full operational mode by restoring a non-reduced power level that is available for the one or more components and that exceeds the threshold power level.

31. The method as recited in claim 29, wherein the reducing power to the one or more components includes turning off power to at least one of the one or more components.

32. The method as recited in claim 29, wherein the receiving the radio signal from the beacon includes receiving a Wi-Fi signal by an electronic book (eBook) reader device, and wherein the reducing the power to the one or more components includes turning off a mobile communications radio.

33. The method as recited in claim 29, further comprising:

classifying the radio signal into a predetermined classification that maps the reduced operational mode to the threshold power level, and wherein the reducing the power to the one or more components is based at least in part on the predetermined classification of the radio signal.

* * * * *